April 5, 1938.      R. J. PARSONS      2,113,531
HEATING AND VENTILATING SYSTEM
Filed April 29, 1935
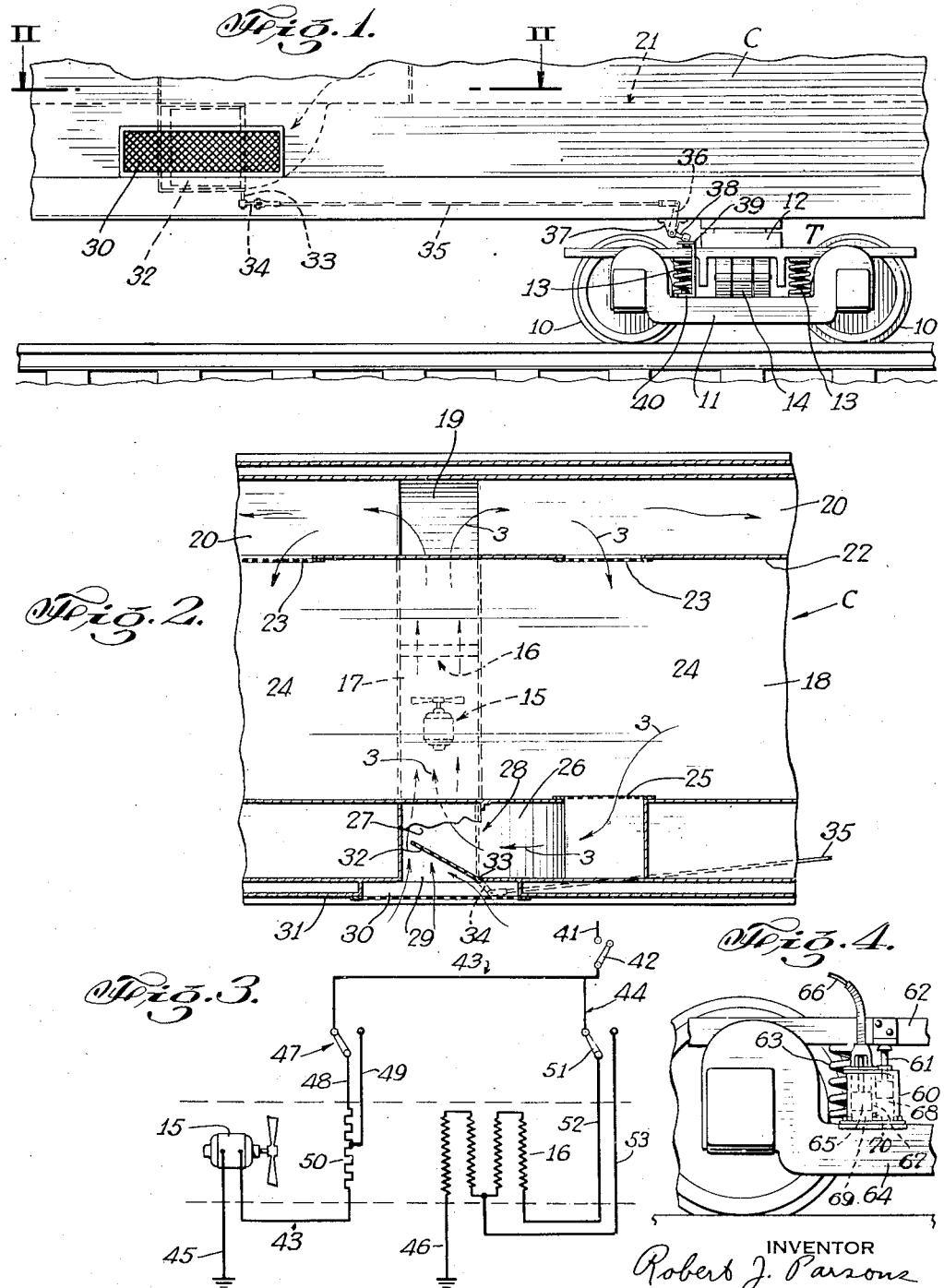
INVENTOR
Robert J. Parsons
BY
Lyman E. Dodge
ATTORNEY Patented Apr. 5, 1938

2,113,531

UNITED STATES PATENT OFFICE 2,113,531

HEATING AND VENTILATING SYSTEM

Robert J. Parsons, Schenectady, N. Y., assignor to Consolidated Car-Heating Company Inc., Albany, N. Y., a corporation of New York Application April 29, 1935, Serial No. 18,889

3 Claims. (Cl. 98—14)

This invention relates to systems for ventilating and/or heating vehicles, especially to car ventilating and heating systems, and more particularly to air conditioning systems for passenger cars, such as electric railway cars.

An object of the invention is to provide means for conditioning the air of a vehicle by ventilating and/or heating in combination with means, operated or controlled automatically by the varying vehicle load to regulate correspondingly the air-condition.

In the operation of a passenger car, for example, when carrying a relatively small number of passengers, less fresh air need be supplied than with a larger number of passengers.

In a heating and ventilating system with a capacity for providing comfortable air condition for the maximum load of passengers say for sixty passengers, the quantity of fresh air required would be approximately 1000 cubic feet per minute. If 1000 cubic feet of air is blown into the car, 1000 cubic feet of heated air is displaced and all of the heat in this exhausted air is lost.

As a smaller number of passengers requires less fresh air, an object of the invention is to provide for a supply of fresh air correspondingly less than 1000 cubic feet per minute, so that less air will be displaced and less heat lost.

A further object of the invention is to provide a means for varying the volume of air circulated in the conduits of an air-conditioning system for a railway car, such as an electric railway car, by means of a damper included in the system and operated by a device the position of which is changed by and in proportion to, the changes in position of the car body relatively to the truck thereof, as the load upon the body is varied, for example, by the entry and/or departure of passengers.

Other objects and advantages will appear as the description of the particular physical embodiment selected to illustrate the invention progresses, and the novel features will be particularly pointed out in the appended claims.

In describing the invention in detail and the particular physical embodiment selected to illustrate the invention, reference will be had to the accompanying drawing and the several views thereon, in which like characters of reference designate like parts throughout the several views, and in which:

Figure 1 is a fragmentary view in side elevation of part of the body of an electric railway car, with one of its trucks, illustrating in somewhat schematic fashion enough of an air-conditioning system, and load-controlled regulating device for the conditioning system, to disclose clearly one embodiment of the invention; Fig. 2 is a similar fragmentary view of a schematic character, in horizontal section, taken on the line II—II of Fig. 1, the arrows at the ends of the line indicating the direction in which the view is taken; Fig. 3 is a diagrammatic view of an electrical circuit in which are included the operating and controlling elements of a conditioning system embodying certain features of the invention; Fig. 4 is a fragmentary detail view in side elevation of a modification of the load-operated controlling device interposed between the car-truck and its body.

In the illustrated and now-preferred embodiment of the invention, referring first to Figs. 1 to 3, the part designated generally by the reference character C is a part of the body of an electric railway car, and T designates generally one of the car-trucks, embodying conventional wheels 10, a drop-frame 11, bolster 12, and springs 13, 14 which may be, and preferably are, of usual, or any suitable form, the springs permitting relative movement between the body of the car and said truck, as the load varies with the entry and departure of passengers.

The body of the car is provided, in pursuance of the invention, with an air-conditioning system, which, for illustrative purposes of the present scheme, comprises what is known conventionally as a blower-ventilating and heating system, designed primarily as equipment for such an electric railway car, although it may be employed in any installation for which it is adapted by the nature of the present invention.

The system comprises an electric fan blower 15, and an electric heater 16, both mounted in a conduit 17 extending across the car body beneath the floor 18, one end of the cross-conduit being in communication, as at 19, with a distributing conduit 20 running lengthwise of the car, beneath the usual side seat 21, and enclosed by the upright wall 22 shown in Fig. 2, through which wall openings 23 permit the air circulated through the conduits to be discharged into the passenger or other compartment 24 of the car body.

At a convenient region, as at 25, an opening permits delivery of the air from compartment 24 to a passage 26 which is in communication, as by a port 28 with a chamber 27 formed by an extension of the conduit 17, this chamber having also a port 29 adapted to receive a supply of fresh air through an opening 30 in the outer wall 31 of the car body.

A damper 32 is mounted swingingly on an upright spindle 33 in position to be swung to any desired angular position within an arc of 90 degrees; and at one end of the arc the damper will close the port 28 so that all air supplied by the blower 15 to the passenger compartment 18 will be fresh air derived from the outer atmosphere through port 29; while at the other end of its arc, the damper will close the port 29, so that no fresh air will be supplied by the blower to the passenger compartment but the confined air will be recirculated as indicated by the arrows 3.

The blower 15 will thus draw air either from outside the car or from inside the car or portions of its air from both regions, depending upon the angular position of the damper 32, which is shown in position to permit a supply of fresh air and recirculated air to be mingled in the chamber 27 and thence drawn in and delivered to compartment 24.

In pursuance of the invention, means are provided to permit the damper to be operated automatically by the change in relative positions of the body C and truck T in proportion as the load is changed by entrance of passengers to the car, and their departure therefrom.

As one convenient device to effect such operation of the damper, the drawing shows in Figs. 1 and 2 a lever arm 34 fixed on the spindle 33 of the damper and connected by a rod 35 to one arm 36 of a bell-crank lever mounted pivotally on a bracket 37 carried beneath the car body C. The other arm 38 of the bell-crank lever is responsive to vertical changes in position of the car body relatively to an upright abutment bracket 39 bolted at 40 upon the drop frame 11 of the truck T, the lever moving in proportion to the extent to which the load depresses the car body; and as the lever 38 contacts with bracket 39.

A variation in the passenger load on the car will cause a deflection in the truck springs 13 according to the weight of the passengers entering or leaving the car, as will be obvious to those skilled in the art, and more or less fresh air will be supplied, as already described.

With a plenum system of this character, it is the intention to provide openings for the air to escape to atmosphere, and while a portion of air will go out through window cracks, openings around doors, etc., other openings may be provided at suitable places (not shown) as in the top of the car, to allow some of the air to exhaust there.

When the cars are being preheated before being put into service, no fresh air is required, but the air recirculated can be entirely the confined air. This will be effected automatically, as the car is without load and the damper 32 will be set to close the port 29, in the manner already described.

Current for supply to the blower and for energizing the heating element or elements 16 may be derived from any suitable source, and controlled or regulated by any suitable devices.

In Fig. 3 a diagram illustrative of a suitable circuit is shown, current being derived by a conductor 41 from a suitable source, not shown, such as the power circuit of the car, a switch 42 serving as a general control for both the blower circuit 43 and the heating circuit 44. The blower circuit is shown conventionally as grounded at 45 and the heater circuit at 46.

A rheostat control switch 47 connected by conductors 48, 49 to different parts of an ohmic resistance 50 permits regulation of the speed of the blower, and consequent volume of air circulated per minute in the system.

A similar controlling switch 51, with conductors 52, 53 leading to taps at different sections of heating elements 16, permits different degrees of heat to be supplied to the circulated air. These switches may be operated by hand, as necessary.

Of course, the arrangement is merely permissive and other arrangements may be substituted by those skilled in the art of car-heating. So also, the connecting rod 35 and its associated levers is only an illustrative form of mechanical device to translate the relative body truck movements into controlling impulses, and numerous other expedients will occur to those familiar with such devices, and may be utilized as found desirable.

In Fig. 4 is shown a modification in which the hydraulic pressure in a cylinder 60 is changed by the varying position of a plunger 61 acted on mechanically by the beam 62 of the truck when the springs 63 are deflected more or less, as the passenger load changes.

These changes in hydraulic pressure within the cylinder 60, which is mounted on the drop frame 64, finally actuate the movements of another plunger 65, also in the cylinder and connected with a flexible shaft 66 movable lengthwise in a flexible metallic conduit of known type, and leading to the lever 34 on spindle 33 of damper 32, or otherwise adapted to regulate the supply of fresh air in any known or suitable way.

The cylinder 60, as shown in Fig. 4, is divided, as at 67, into chambers 68 and 69, which are in communication with each other through the port 70, and through this port fluid pressure, developed in the chamber 68 by descent of plunger 61 when forced downward by the beam 62, is made effective in chamber 69 to force the plunger 65 upward.

When the passenger load is decreased and beam 62 is biased upward by the springs 63, the greater weight of the larger plunger 65 can be relied upon to restore the parts to their Fig. 4 position, or if found desirable the return bias may be increased sufficiently by any known or suitable means, such as added weight or a spring over the plunger 65.

Such operations may be effected also by aerostatic or hydraulic pressure produced in a suitable conduit by means of a bellows actuated by the body-truck relative movements; or a rheostat arm may be actuated by body-truck mechanical connections, and suitable electric current impulses sent to solenoids or to a motor for operating the damper. Such modifications need not be illustrated, as their mode of operation is well-known, and the two specific examples above and illustrated in the drawing suffice to indicate the generic character of my improvements.

Although I have particularly described one particular physical embodiment of my invention and explained the operation, construction and principle thereof, nevertheless, I desire to have it understood that the form selected is merely illustrative, but does not exhaust the possible physical embodiments of the idea of means underlying my invention.

What I claim as new and desire to secure by Letters Patent of the United States, is:

1. In an air-conditioning system for an electric-railway car having a passenger compartment, an air-circulating element, an air-heating element, a conduit through which said elements circulate conditioned air to and from said compartment, a damper in said conduit, and in combination with said elements fluid pressure means mounted on the running gear, including a cylinder enclosing a body of fluid, a piston adapted to be moved in said cylinder to displace fluid therewithin proportional to relative movement between the compartment and running gear, and a piston adapted to be actuated by said displaced fluid to operate said damper automatically in correspondence with, and governed by, the changes in load incidental to entry and other movements of passengers, and thereby to control and regulate the operation of said system, throughout a wide range of such changes.

2. In an air-conditioning system for the passenger compartment of an electric railway passenger car, the combination with an electric blower and an electric heater cooperating therewith to condition and circulate air through the passenger compartment of said car, including fresh air and recirculated air selectively, of a device actuated by changes in the passenger load to cause increase of recirculatory air-movements as the passenger load is diminished and to provide an increasing increment of fresh air proportionately as the passenger load is increased throughout a wide range of said changes and means to regulate the operation of said heater element.

3. In an air-conditioning system for an electric railway car having a passenger compartment, an air-circulating element, a heating element, conduits in which said elements operate respectively to condition and circulate air through said passenger compartment, including a chamber, a conduit passage having a port adapted to receive confined air from said passenger compartment, and a port adapted to deliver said air to said chamber, a port opening from said chamber to the outer air and a conduit passage in communication with said chamber and adapted to deliver air therefrom to said compartment, a damper device in said chamber adapted to open and close selectively said port to the outer air and said port to the passage leading from the passenger compartment to the chamber, to regulate selectively the delivery of entirely fresh, entirely recirculated and mingled air to said passenger compartment, said car having a frame carrying said passenger compartment, a truck on which said frame is spring-supported, and a fluid-pressure means adapted to control said delivery of air, said last-named means comprising a cylinder mounted on said truck and enclosing a body of fluid, a piston in said cylinder and having a rod disposed in position to be contacted by a part of said frame and to be moved thereby to displace a portion of said enclosed body of fluid within said cylinder proportional to load-influenced relative movements between said frame and truck, another piston in said cylinder adapted to be moved by said displacement of fluid, and a conduit-enclosed flexible shaft connected with said last-named piston and having an operating connection with said damper device, said flexible shaft being movable lengthwise by said last-named piston to operate said damper device and thereby to control said delivery of air.

ROBERT J. PARSONS.